(No Model.)  
2 Sheets—Sheet 1.
J. B. WEST.
GAGE FOR TIRE SETTERS.
No. 444,165. Patented Jan. 6, 1891.
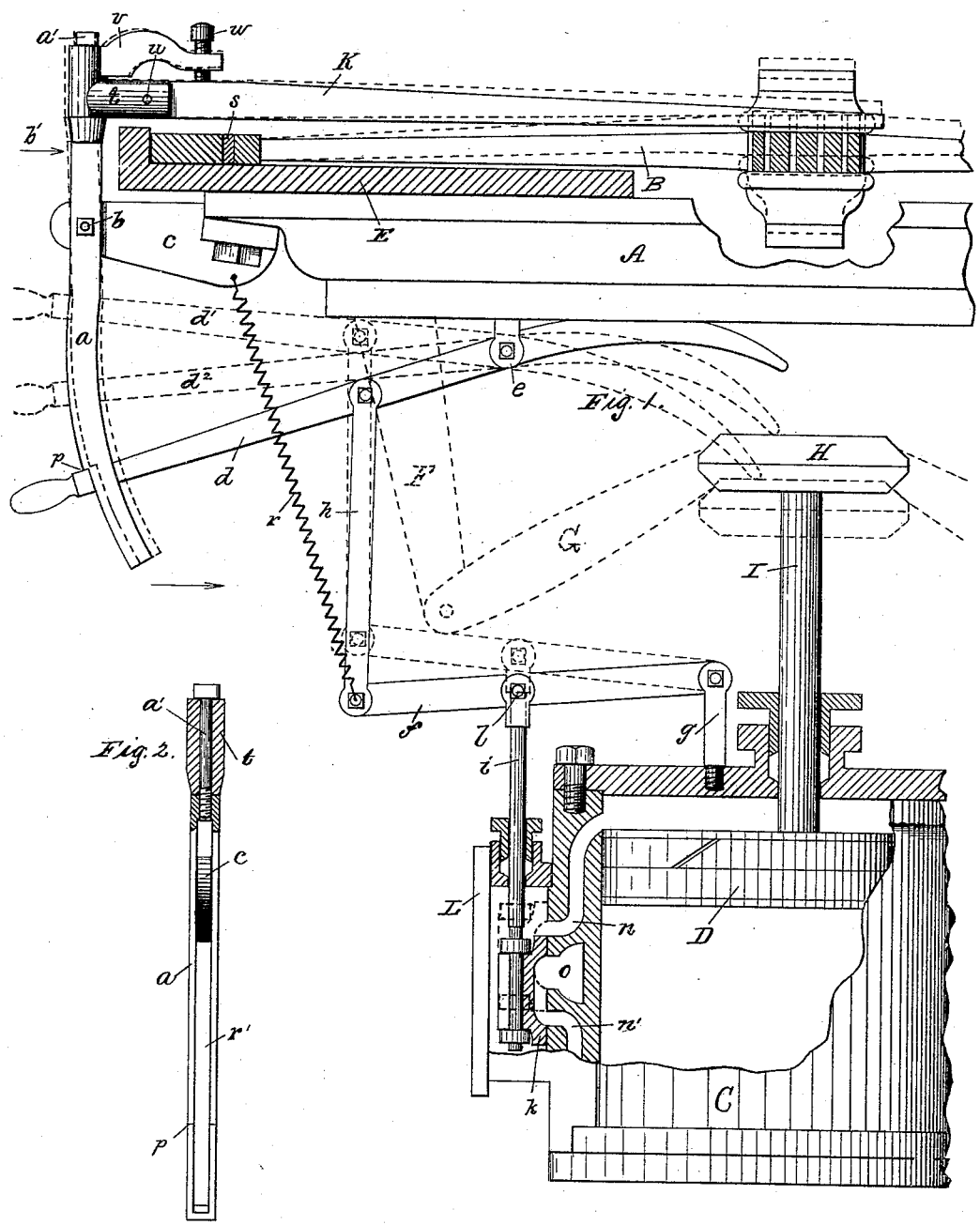

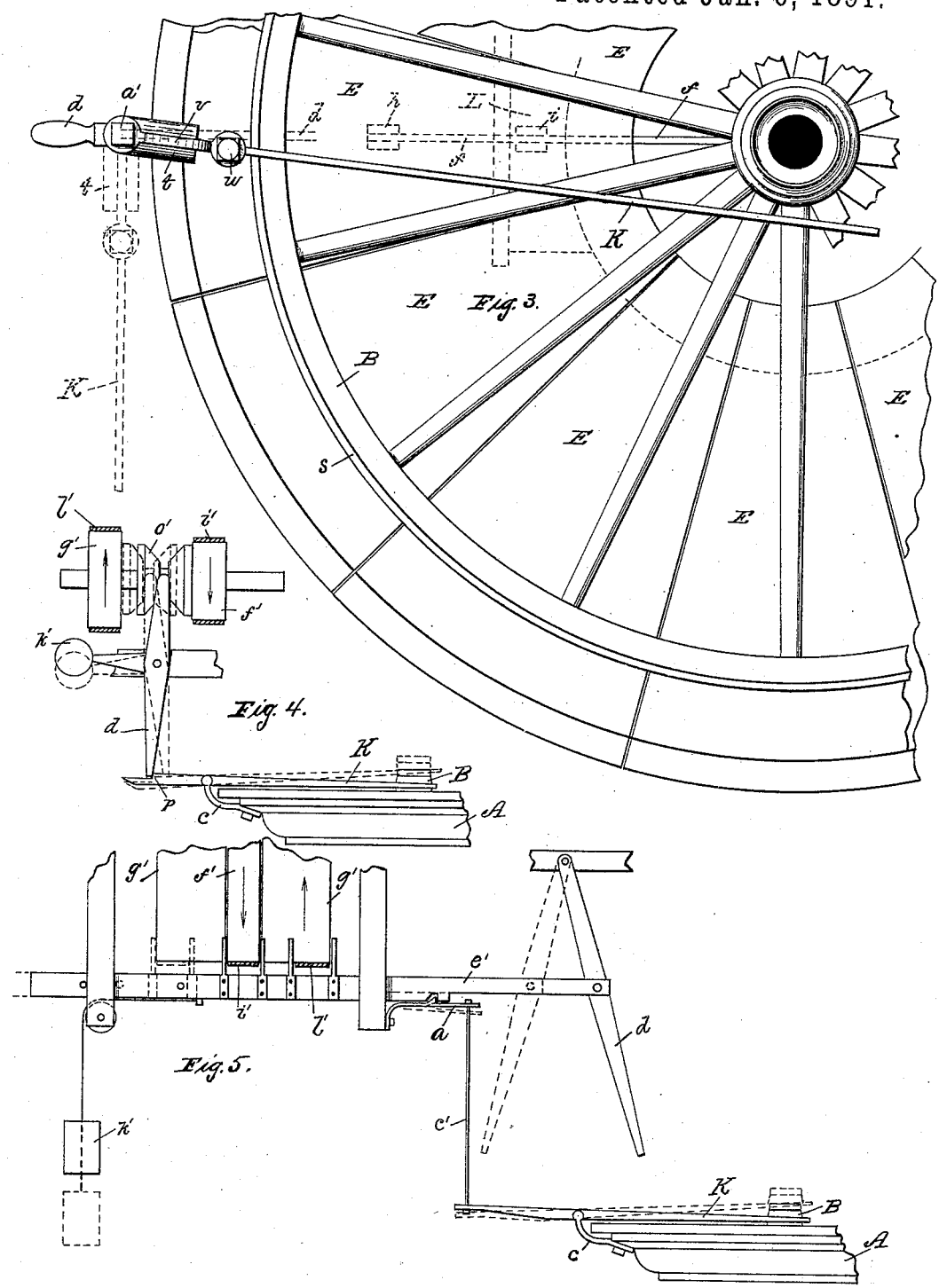

UNITED STATES PATENT OFFICE.

JONATHAN B. WEST, OF ROCHESTER, NEW YORK.

GAGE FOR TIRE-SETTERS.

SPECIFICATION forming part of Letters Patent No. 444,165, dated January 6, 1891.

Application filed March 17, 1890. Serial No. 344,230. (No model.)

*To all whom it may concern:*

Be it known that I, JONATHAN B. WEST, of Rochester, in the county of Monroe and State of New York, have invented a new and useful Improvement in Gages for Tire-Setters, which improvement is fully set forth in the following specification and shown in the accompanying drawings.

My present invention relates to machines for setting tires when cold upon wheels by radial inward pressure; and the invention consists more particularly in providing a gage or stop by means of which, when a tire in any given case is sufficiently firmly set upon the wheel, the power, of whatever nature it may be, will be automatically cut off or stopped. This avoids the liability of overstraining the wheel and also enables the operator to set tires all alike or with the same stress upon any number of wheels in succession.

The novel features of the invention are hereinafter fully described, and more particularly pointed out in the claims.

Referring to the drawings, Figure 1 shows a side elevation of a tire-setting machine with my invention attached, parts being broken away and vertically sectioned and other parts shown in various positions by full and dotted lines; Fig. 2, a view of a detent sectioned in part through a vertical axis, seen as indicated by arrow $b'$ in Fig. 1; and Fig. 3, a plan of part of the machine with the gage in place. Figs. 4 and 5, drawn to a smaller scale, show the application of my invention to tire-setting machines operated by means of a belt.

In the main figures the compressing force of the machine is shown as being effected by means of piston-pressure; but it may be effected by a screw driven by a belt or other gearing, or by other well-known mechanical means.

The main feature of my present invention is to automatically stop the pressure, whatever may be its source, upon the tire at the proper time directly from the action of the wheel itself.

Referring to the parts shown in the drawings, A is a part of the frame of a machine for pressing tires when cold upon wagon-wheels by an inward pressure.

B is a wheel in place to be operated upon.

C is a power-cylinder for effecting the pressure necessary to set the tire, the piston D being actuated by steam, compressed air, water, or other fluid.

E are the compressing-jaws, which, being forced inward toward the center, act upon the tire to compress it. These compressing-jaws are operated by levers F and connecting-bars G, connecting said levers and the head H of the piston-rod I of the power-cylinder.

In my present invention I employ a gage-arm or gage K, resting horizontally over the wheel near the hub, to be operated by the spokes as the wheel dishes on account of the stress of the compressing-jaws. The gage acts either as a detent or is connected to operate a detent for the mechanism controlling the driving-power of the machine. As shown, the gage is held in the head $t$ of a detent $a$, Figs. 1 and 2, pivoted at $b$ to an arm $c$, rigid with the frame A. The gage K and the detent $a$ together form practically a single piece in the form of a bent lever pivoted at $b$ to an arm $c$, rigid with the frame A, the part $a$ being formed with a vertical space $r'$, within which a hand-lever $d$ plays, said lever being pivoted in a stud $e$, rigid with the frame.

Beneath the lever $d$ is a second lever $f$, pivoted in a rigid stud $g$, the two levers being connected by a link or tie $h$. The rod $i$ of the valve $k$ is pivotally connected at $l$ with the lever $f$, and a tension-spring $r$ connects the lever $f$ with the arm $c$, tending to draw the valve upward. The gage K with the detent $a$, lever $d$, link $h$, lever $f$, rod $i$, and the spring $r$ constitute a mechanism to operate the valve $k$. From this construction of parts it will be seen that a vertical motion of the hand-lever $d$ will cause the valve to move upon its seat on the cylinder. The cylinder C with its piston D, rod I, steam-chest L, valve $k$, and side pipes $n$ $n'$, and exhaust $o$ are all substantially of common construction. When the hand-lever $d$ is pushed downward to the position shown in full lines, the valve will thereby be moved downward to the position shown in full lines, opening the port $n$ of the cylinder, and allow the fluid to pass in on top of the piston and force the latter downward. As the parts are connected, a downward motion of the piston results in compressing the tire upon the wheel.

The detent $a$ is formed with a notch $p$ to catch the hand-lever for the purpose of holding the valve in position to uncover the cylinder-port n, as above stated, against the action of the spring r, which tends to pull the valve upward in position to cover the port n and open the port n'. When the center of the wheel springs upward or "dishes" from the stress of the compressing-jaws, it carries the free end of the gage upward, causing the lower end of the detent to move inward and release the hand-lever d. The latter is immediately lifted to its upper position d' by the tension-spring r, which causes the valve to cover the port n and exhaust the fluid from above the piston, and at the same time open the port n' and allow the fluid to flow in under the piston and lift the latter. This carries the compressing-jaws back and releases the wheel. This dishing of the wheel and operation of the gage and valve occur each time a wheel is subjected to pressure by the jaws, and the actions being automatic and uniform all the tires are set alike and the wheels all sustain the same degree of compression and are uniformly dished. The dishing of the wheel, which is the true indication of the amount of the stress to which it is subjected, I use as a cause or means for cutting off the power that compresses the tire.

The amount that a wheel is dished under the stress is regulated by adjusting the gage K. This gage is not rigid in the head of the detent a, but is pivoted at u, so as to be turned slightly in a vertical direction. Over it is an arm v, rigid with the head t, holding a stop-screw w to bear upon the gage. By compressing the gage by means of the screw w it will be nearer the spokes of the wheel and be acted upon by them sooner in the upward motion of the center of the wheel or when the wheel is dished to a less degree, and, on the other hand, if the screw and gage are raised, the wheel will be dished to a greater degree before the gage is acted upon and the power cut off. The friction of the gage is designed to be sufficient to hold it from dropping upon the wheel. The head t of the detent is joined to the lower part by a vertical bolt a', which constitutes a pivot upon which the gage may be swung horizontally away from over the wheel, as indicated by dotted lines in Fig. 3, when a wheel is put in or taken out of the machine. The hand-lever d has its inner end extended over the head H, to be acted upon by the latter, as shown, for the purpose of automatically moving the valve by means of the mechanism shown to a position in which both ports of the cylinder are covered and the fluid shut out therefrom. The valve is of sufficient length to cover both ports, and when, after the spring has carried the hand-lever to the position d', the piston moves upward the head H encounters the hand-lever and moves it to the intermediate position $d^2$, in which position the valve stands midway of its travel and covers both ports of the cylinder, as stated. This is important, for in case steam or gas is the motive power, the cylinder below the piston would be filled each time at full pressure, resulting in a waste, as all that is required below the piston is just sufficient pressure to lift it with the parts connected.

In case belts are employed, instead of a cylinder, to operate the compressing-jaws, as above stated, a construction similar to that shown in Fig. 5 is employed, in which the detent a holds the shifter for the belt, consisting of the hand-lever d and bar e'. By throwing the hand-lever to the right, as shown in the position drawn in full lines, the driving-belt i' is carried onto the operating-pulley f' and effects the compressing of the tire. The detent holds the belt in position until the former is withdrawn by the action of the gage K, which is connected with the detent by a rod c'. When the gage is raised by the wheel, the detent is withdrawn from the belt-shifter and a weight k' moves the shifter to the left, carrying the belt i' onto the left-hand idler g' and the oppositely-moving belt l' onto the operating-pulley f', thus reversing the motion of the compressing-jaws.

Should a clutch o' be employed, as shown in Fig. 4, instead of shifting the belt to alternately engage the oppositely-moving belt-pulleys the hand-lever d, operating the clutch, is controlled by the gage, as shown. Moving the lower end of the lever to the left carries the clutch against the operating-pulley f', which compresses the tire and at the same time allows the lever to be caught in the detent-notch p of the gage. When the wheel from becoming dished lifts the gage, the hand-lever is released and the attached weight k' quickly throws the clutch against the other pulley g' and withdraws the compressing-jaws. In every case the power for compressing the tire is started or thrown on by the hand of the attendant and thrown off or stopped by means of a weight or spring, the detent for holding said spring or weight being released automatically by the gage.

What I claim as my invention is—

1. In a machine for compressing tires or bands upon wheels, a gage acted upon by the wheel, in combination with a weight or spring to throw off the power and a detent for said weight or spring operated by said gage, substantially as described and shown.

2. In a machine for setting tires or bands upon wheels, a gage acted upon by the wheel, in combination with a weight or spring to throw off the power and a detent for said weight or spring operated by said gage, the latter being adjustable with reference to the wheel, substantially as set forth.

3. In a machine for setting tires upon wheels, a gage over the wheel to be acted upon by the latter, in combination with a spring or weight to throw off the power and a detent for said weight or spring operated by the gage, the latter being pivoted so as to be turned away from the wheel, substantially as and for the purpose set forth.

4. In a machine for setting wagon-tires, a power-cylinder and a valve for the cylinder, in combination with a spring to move the valve, a detent for the valve to hold the latter in place against the action of the spring, and a gage to release the valve, substantially as shown, and for the purpose set forth.

5. In a machine for setting wagon-tires, a power-cylinder and a valve for the cylinder, in combination with a lever, a spring to move the valve, and a head to act upon said lever to move the valve against the action of the spring, substantially as and for the purpose specified.

In witness whereof I have hereunto set my hand, this 12th day of March, 1890, in the presence of two subscribing witnesses.

JONATHAN B. WEST.

Witnesses:
E. B. WHITMORE,
M. L. McDERMOTT.